C. HITCHCOCK.
Coffee Urns.

No. 145,653.        Patented Dec. 16, 1873.

Witnesses.

Cornelia Hitchcock
Inventor
By Atty.

UNITED STATES PATENT OFFICE.

CORNELIA HITCHCOCK, OF MILLDALE, CONNECTICUT, ASSIGNOR TO HERSELF AND WILLIAM J. CLARK, OF SAME PLACE.

IMPROVEMENT IN COFFEE-URNS.

Specification forming part of Letters Patent No. 145,653, dated December 16, 1873; application filed October 17, 1873.

*To all whom it may concern:*

Be it known that I, CORNELIA HITCHCOCK, of Milldale, in the county of Hartford and State of Connecticut, have invented a new Improvement in Coffee and Tea Urns; and I do hereby declare the following, when taken in connection with the accompanying drawings and the letters of reference marked thereon, to be a full, clear, and exact description of the same, and which said drawings constitute part of this specification, and represent, in—

Figure 1:
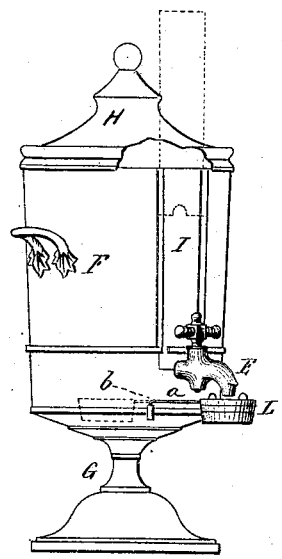
Figure 2:
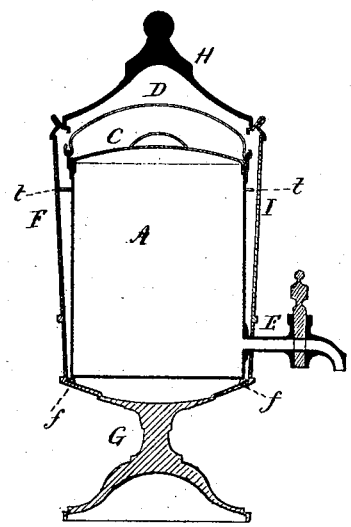
Figure 3:
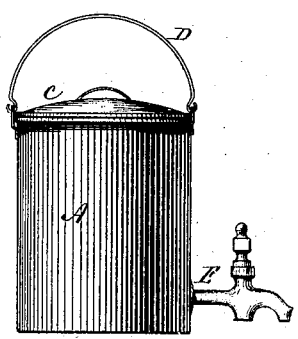

Figure 1, a perspective view, a portion of the cover broken away to illustrate the invention; Fig. 2, a vertical central section through the faucet; and, in Fig. 3, the boiler, detached.

This invention relates to an improvement in coffee and tea urns, the object being such a construction that the vessel or boiler in which the coffee or tea is made may be detachable from the urn; and the invention consists in a vessel made from any suitable hard metal, such as may be placed upon a stove, this vessel provided with a drawing-faucet and combined with a case within which the said vessel may be set and inclosed, provision being made for the passage of the faucet through the side of the urn, as more fully hereinafter described.

A is the boiler, which is made from tin or similar metal, provided with its cover C, bail D, and faucet E. F is a case of any desirable form, resting upon a base, G, the diameter of the case greater than that of the vessel A, and the height also greater, so that when the vessel A is placed within the case F a cover, H, may be placed over all and inclose the vessel, leaving a space or chamber entirely around the inner vessel A. In order that the faucet may pass down the side of the vessel, I arrange a vertical slide, I, in the side of the case F at which it is desired the faucet should be. This slide when removed opens down to the point where the faucet will rest. The slide is removed or opened when the vessel is to be introduced, and then closed and the cover placed thereon. To remove the vessel, the space above the faucet must be opened; then, by means of the bail, the vessel may be drawn up from the case. The space above the faucet, while preferably filled by a vertical slide, but may be a hinged portion, to open, or be otherwise arranged, it only being essential that some provision be made for an opening over the faucet.

By this construction the vessel in which the coffee or tea is made may be introduced into the case, a convenience not attainable in the usual construction; and, further, the case, forming a chamber around the vessel, prevents the contact of the outer air with the vessel, and, consequently, retains the heat very much longer than when the vessel is directly exposed.

To support the vessel within the case, a flange or studs, $t$, project from the case inward toward the vessel, as seen in Fig. 2, and bearing-points $f$ are, preferably, arranged at the bottom, upon which the vessel will set.

To catch the drip from the faucet, I arrange a cup, L, upon an arm, $a$, hung to the case at $b$, so that it may be turned to one side from the faucet, as denoted by the broken lines in Fig. 1, when drawing from the urn, and, after drawing, turned beneath the faucet, as seen in Fig. 1.

I claim as my invention—

1. In combination with a vessel, A, provided with a faucet, E, the case F, with its cover H, the said case F having a vertical opening to permit the passage of the faucet, so that the vessel may be removed from or set into the said case, and means for closing said opening, substantially as described.

2. In combination with an urn having a faucet, $e$, leading therefrom, the drip-cup L, hung to the urn so as to be turned to and from the faucet, substantially as set forth.

CORNELIA HITCHCOCK.

Witnesses:
JULIUS D. BRISTOL,
EDWARD A. CORNWALL.